3,425,941
METHOD OF PREPARING CALCIUM ALKYLPHENOLATES
Doris Kivelevich, Fishkill, N.Y., assignor to Texaco Inc., New York, N.Y., a corporation of Delaware
No Drawing. Filed Sept. 26, 1966, Ser. No. 581,743
U.S. Cl. 252—42.7        8 Claims
Int. Cl. C10m 1/08

ABSTRACT OF THE DISCLOSURE

Method of preparing a lubricating oil composition of detergent properties containing a calcium salt of an alkylphenol comprising contacting in the presence of a lubricating oil, alkylphenol with calcium carbide and an alkanol or alkoxyalkanol.

---

This invention relates to a method of preparing lubricating oil concentrates of calcium alkylphenolate.

Hereinbefore and hereinafter the term "calcium alkylphenolate" encompasses overbased as well as normal calcium alkylphenolates. The normal calcium alkylphenolate is defined as one having a calcium metal ratio of 1. Overbased calcium alkylphenolate is defined as one having calcium metal ratio greater than 1. Calcium metal ratio is defined as the ratio of the number of equivalents of calcium per equivalent of the alkylphenol moiety.

The calcium alkylphenolates are useful as additives for lubricating oils in that they promote when used in crankcase lubricants for internal combustion engines, general engine cleanliness and reduced ring sticking, piston skirt varnish formation and corrosiveness of the oils to which they are added. The overbased calcium alkylphenolates have been found to give particularly superior results. Normally, the contemplated calcium salts are prepared in the form of lube oil concentrates to facilitate their manufacture, handling and incorporation in finished lubricating oil compositions.

In the past, one of the methods employed for preparing the calcium alkylphenolates comprised reacting alkylated phenol with calcium oxide or calcium hydroxide. Although this method produced a satisfactory normal calcium alkylphenolate, it had a major drawback of being relatively slow and producing a large amount of unfilterable and non-oil dispersible calcium compounds which results in a substantial loss of desired calcium values as well as requiring complex filtration procedures. Further, reaction of the alkylated phenol with calcium oxide or calcium hydroxide does not permit the production of an overbased calcium alkylphenolate. Another method for allegedly preparing calcium alkylphenolates is by directly reacting calcium carbide with alkylated phenol in the absence of any other ingredients. This second past method has the disadvantage of requiring minimum initial reaction temperature of about 200° C. and higher which undesirably promotes deterioration of reactants and product. In addition, as with calcium oxide and calcium hydroxide reaction the direct calcium carbide reaction undesirably does not lend itself to the formation of the most desirable overbased calcium alkylphenolate. Still further, the excessively high reaction temperatures undesirably require more costly equipment and increased handling times.

I have discovered, and this constitutes my invention, a method of preparing at reduced temperatures in high yields lubricating oil concentrates of normal and overbased calcium alkylphenolates, e.g., calcium metal ratio up to about 3, in a relatively rapid manner with the production of little or no undesired oxidation by-products and/or undesirable, unfilterable, non-lube oil dispersible calcium products. More particularly, the method of the invention comprises contacting in the presence of a lubricating oil and alkylated phenol of the general formula:

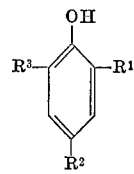

where $R^1$ and $R^3$ are selected from the group consisting of hydrogen and alkyl of from 1 to 30 carbons and $R^2$ is alkyl of from 4 to 30 carbons with calcium carbide and an alcohol of the formula AOH where A is $R^4OR^5$— or $R^6$— and where $R^4$ is a monovalent saturated aliphatic hydrocarbon radical (alkyl) of from 1 to 5 carbons, $R^5$ is polymethylene of from 2 to 4 carbons, and $R^6$ is alkyl of from 1 to 6 carbons.

The reaction is conducted at a temperature between about 65° and 150° C., advantageously utilizing a mole ratio of calcium carbide to alkylated phenol of between about 0.5:1 and 2:1 and a mole ratio of alkylphenol to alcohol of between about 1:1 and 1:20. When a normal calcium salt is desired, i.e., of the formula:

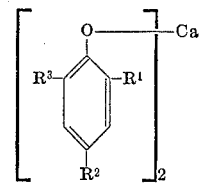

the ratio of calcium carbide to alkylphenol is desirably between about 1:0.5 and 1:1 and when an overbased calcium salt is desired, i.e., of the formula:

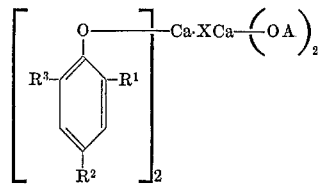

where X is an integer from 1 to 3, the ratio is at least about 1:1. The quantity of lubricating oil employed can be widely varied, e.g., between about 10 and 90 wt. percent of the reaction mixture. However, most desirably it is that quantity which will result in a final lube oil concentrate after removal of free alcohol comprising between about 45 and 55 wt. percent lubricating oil and between about 55 and 45 wt. percent calcium alkylphenolate. Superatmospheric pressure can be employed when necessary to prevent escape of reactants.

Under preferred conditions, the calcium carbide is incrementally added to a mixture of alkylated phenol, alcohol and lube oil to promote a controlled reaction resulting in optimum yields and a minimal amount of undesirable and unfilterable formation. Further, under preferred conditions an inert gas such as nitrogen is continually passed through the reaction zone prior to and/or during the reaction to remove any water impurities and explosive gaseous by-products such as acetylene.

The calcium salt containing lube oil concentrate can be isolated from the final reaction mixture by standard means such as removing the free alcohol and any volatile byproducts as a distillate at temperatures between about 100 and 200° C., advantageously employing in conjunction with the distillation a stripping operation involving the passage of inert gas such as nitrogen through the final reaction mixture to effect essentially complete removal of the alcohol and volatile products leaving a stripped calcium salt containing lube oil concentrate. Temperatures in the neighborhood of about 150 to 180° C. are normally employed in the stripping operation in conjunction with reduced pressures employed if necessary. The stripped concentrate can be further purified by filtering, e.g., utilizing a filter bed of finely divided diatomaceous silica to remove the undesired large solid product particles thereby recovering a purified calcium salt containing lube oil concentrate.

The method of the invention may be further described and theorized by the following equations utilizing 2-methoxyethanol, 4-dodecylphenol and calcium carbide as the reactants.

(a) Normal Calcium Salt

1.

$$CaC_2 + 2CH_3OCH_2CH_2OH \longrightarrow (CH_3OCH_2CH_2O)_2Ca + C_2H_2$$

2.

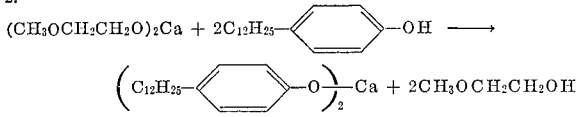

(b) Overbased Calcium Salt

1.

$$(1 + X)CaC_2 + (2 + 2X)CH_3OCH_2CH_2OH \longrightarrow$$
$$(1 + X)(CH_3OCH_2CH_2O)_2Ca + (1 + X)C_2H_2$$

2.

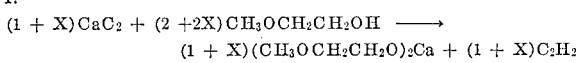
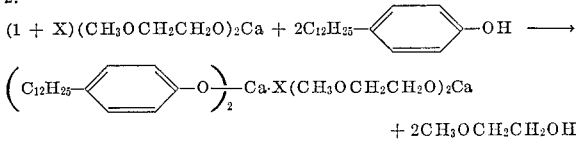

X is an integar from 1 to 3.

As can be seen from the above, the overbased calcium alkylphenolate is believed to be a coordinated complex of normal calcium alkylphenolate and calcium alcoholate.

Examples of the alkylated phenols contemplated herein are the alkylphenols prepared by alkylating phenol with an olefin polymer such as propylene polymer containing 9 to 30 carbons. One specific example is a mixture of alkylphenol resulting from the alkylation of phenol with a propylene tetramer. This mixture is composed of phenols having $C_{10}$ to $C_{12}$ alkyl groups in the para ring position. Further specific examples of suitable alkylated phenols are 4-butylphenol; 4-amylphenol; 4-hexylphenol; 4-octylphenol; 4-hexadecylphenol; 2,4-dibutylphenol; 2,4-dioctylphenol; 2,4-dihexadecylphenol; 2,4-dioctadecylphenol; 2,4,5-tributylphenol; 2,4,5-trioctadecylphenol; 4-eicosylphenol and mixtures thereof.

Examples of the alcohols employed in the reaction are 2-methoxyethanol, 2-ethoxyethanol, 2-butoxyethanol, 3-methoxypropanol, methanol, butanol and hexanol.

The calcium carbide employed is preferably in the powdered form, e.g., of a mesh size of less than about 20 (U.S. Standard) in order to facilitate reaction, however, particles of diameters up to ¼" and higher perform satisfactorily in the method.

As heretofore stated, the reaction is effected in the presence of a lube oil fraction. Examples of the lube oils which can be employed are the mineral lubricating oils, e.g., of the refined paraffin and napthenic base variety having an SUS viscosity at 100° F. of between about 50 and 300. Examples of the synthetic lubricating oils contemplated herein are those of an SUS viscosity at 100° F. of between about 50 and 300 of the polymer variety such as polymers of propylene and polyoxypropylene. Carboxylic acid esters are also contemplated as synthetic oil within the definition of the invention such as the esters, diesters, triesters, tetraesters and complex esters of adipic and azelaic acids with alcohols, such as butyl, 2-ethylhexyl and dodecyl alcohols and esters of acids of phosphorus such as diethyl esters of decane-phosphonic acid and tricresyl phosphate.

The following examples further illustrate the method of the invention but are not to be construed as limitations thereof:

EXAMPLE I

This example illustrates in three distinct runs the preparation of normal calcium alkylphenolate from calcium carbide, $C_{10}$–$C_{12}$ alkylphenol and methoxyethanol.

To a 2 liter flask fitted with a stirrer, reflux condenser and thermocouple for temperature control, there was charged 300 grams (1 mole) of an alkylphenol of the formula:

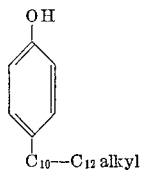

180 grams naphthenic mineral lubricating oil of an SUS viscosity of about 100 at 100° F., and 500 mls. of 2-methoxyethanol. The mixture was heated to reflux (124° C.) with nitrogen being passed therethrough at a rate of 500 mls./min. Calcium carbide was then added slowly to the refluxing mixture. In Runs A and B the calcium carbide was a powder having a sieve size of less than 20 mesh (U.S. Standard). In Run C the calcium carbide was in the form of lumps having from $\frac{1}{12}$" to ¼" diameters. At the end of the calcium carbide addition, the reaction mixture in Run B was refluxed for an additional 3 hours, in Run C for an additional 24 hours and in Run A there was no additional refluxing. The free 2-methoxyethanol was then stripped from the reaction mixture by heating the reaction mixture to a temperature of 177° C. while passing nitrogen gas therethrough. At the end of the solvent stripping period the residual mixture was stirred for an additional 3 hours at 177° F. with continued nitrogen blowing and then filtered through a cake of diatomaceous silica. The filtrate was analyzed and found to be a lube oil concentrate solution of normal calcium alkylphenolate of the formula:

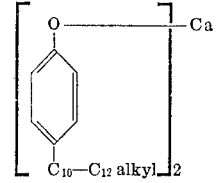

Specific analysis of the lube oil concentrate filtrate found the following:

TABLE I

| Analyses | Run A | Run B | Run C |
|---|---|---|---|
| Percent Ca | 3.9 | 3.8 | 3.9 |
| Kin. Visc. at— | | | |
| 100° F., cs | 2,219 | 2,000 | 2,592 |
| 210° F., cs | 50 | 44 | 59 |
| Wt. Percent Yield of Concentrate | [1] 90 | [2] 92 | [1] 90 |

[1] 450 grams.
[2] 460 grams.

Example II

This example further illustrates the preparation of the normal calcium alkylphenolate.

To a 2 liter flask fitted with stirrer, condenser, and themocouple for temperature control, there was charged 1000 mls. of 2-methoxyethanol. The methoxyethanol was heated to reflux (124° C.) with nitrogen blowing at a rate of 500 mls. per minute. To the refluxing methoxyethanol 35.5 grams (0.55 m.) of calcium carbide lumps ($\frac{1}{12}$" to ¼" diameter) were slowly added and the resulting mixture was refluxed (124° C.) for a period of 22 hours. At the end of the 22 hour period 300 grams (1.0 mole) of an alkylphenol of the formula:

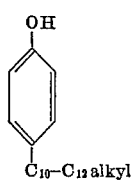

and 180 grams of naphthenic mineral oil of an SUS viscosity of 100 at 100° F. were charged to the reaction mixture and the mixture was refluxed (124° C.) for a period of 3 hours. At the end of the 3 hour period the free 2-methoxyethanol was stripped from the reaction mixture by heating said mixture to 177° C. utilizing nitrogen blowing at a rate of 500 mls. per minute. The reaction mixture was then stirred at 177° C. for an additional 3 hour period and filtered through a bed of diatomaceous silica. The filtrate was identified as the lube oil concentrate of normal calcium alkylphenolate of the formula:

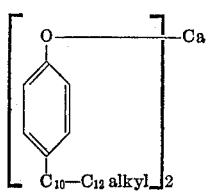

in a yield of 82.6 wt. percent (413 grams). The concentrate gave the following analysis: wt. percent Ca=3.9, Kin. visc. (cs.) at 100° F.=1937, at 210°=46.

Example III

This example still further illustrates the preparation of normal calcium alkylphenolate.

To a 2 liter flask fitted with a stirrer, condenser and thermocouple for temperature control there was charged 300 grams (1 mole) of an alkylphenol of the formula:

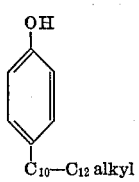

180 grams of a naphthenic mineral lubricating oil of an SUS viscosity of 100 at 100° F. and 500 mls. of methyl alcohol. The resultant mixture was heated to reflux (65° C.) in a nitrogen atmosphere and 40 grams (0.625 m.) of powdered calcium carbide of less than 20 mesh (U.S. Standard) particle size were slowly added. The resultant mixture was refluxed (65° C.) for 24 hours, followed by the stripping off of residual methanol at 177° F. The stripped residual mixture is then stirred for an additional 3 hours at 177° C. and filtered through a bed of diatomaceous silica. The filtrate was analyzed and determined to be a lube oil containing calcium alkylphenolate of the formula:

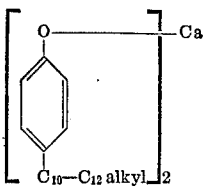

The lube oil filtrate was further determined to have a calcium content of 3.1 wt. percent which represented a yield basis calcium alkylphenolate of 78 wt. percent.

Example IV

This example illustrates the preparation of an overbased calcium alkylphenolate.

To a 2 liter flask fitted with a stirrer, condenser, and thermocouple for temperature control, there was charged 500 mls. of 2-methoxyethanol, 150 grams (0.5 mole) alkylphenol of the formula:

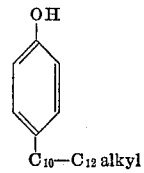

293 grams naphthenic lubricating oil of an SUS viscosity of 100 at 100° F. The resultant mixture was heated to reflux (124° C.) with nitrogen blowing at a rate of 500 mls. per minute. Forty grams (0.625 mole) of powdered (less than 20 mesh) calcium carbide was added slowly to the refluxing mixture. At the end of the calcium carbide addition the mixture was refluxed for an additional 3 hours with nitrogen blowing and then stripped to 177° C. with nitrogen blowing and stirred at 177° C. for an additional 3 hours, nitrogen blowing taking place throughout the entire procedure. The mixture was then filtered and determined to be the lube oil concentrate of overbased calcium alkylphenolate of the formula:

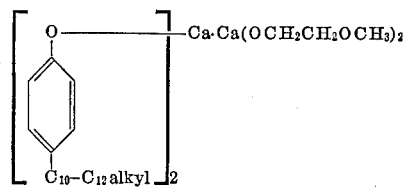

giving the following analysis: wt. percent calcium=3.9, metal ratio=2, Kin. visc. (cs.) at 100° F. of 403, at 210° F. of 21. The calculated yield of lube oil concentrate was 83% (413 grams).

Example V

This example illustrates the criticality of employing alcohol as defined as an ingredient in the method of the invention.

To a 2 liter flask fitted with a stirrer, condenser and thermocouple for temperature control there was charged 300 grams (1 mole) of alkylphenol of the formula:

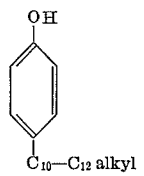

180 grams of naphthenic mineral lubricating oil of an USS viscosity at 100° F. of 100 and 500 mls. of xylene. The mixture was heated under a blanket of nitrogen to reflux (140° C.). To the refluxing mixture there was added 35.2 grams (0.55 mole) of powdered (20 mesh) calcium carbide and refluxing was continued for an additional 50 hours. At the end of the 50 hour period the residual xylene was stripped at 177° C. with nitrogen blowing. The stripped mixture was filtered through diatomaceous silica and the filtrate was analyzed and no measurable amount of calcium alkylphenolate was found therein.

I claim:
1. A method of preparing a lubricating oil composition containing a calcium salt of an alkylphenol of the formula:

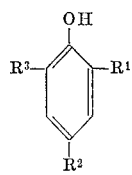

where $R^1$ and $R^3$ are selected from the group consisting of hydrogen and alkyl of from 1 to 30 carbon and $R^2$ is alkyl of from 4 to 30 carbons comprising in the presence of a lubricating oil contacting said alkylphenol with calcium carbide and an alcohol of the formula A—OH where A is alkyl of from 1 to 6 carbons or $R^4OR^5$, where $R^4$ is alkyl of from 1 to 5 carbons and where $R^5$ is polymethylene of from 2 to 4 carbons, at a temperature between about 65 and 150° C. utilizing a mole ratio of said calcium carbide to said alkylphenol of between about 0.5:1 and 2:1 and a mole ratio of said alkylphenol to said alcohol of between about 1:1 and 1:20 subsequently separating said alcohol from the final reaction mixture and then filtering the alcohol free final reaction mixture to recover said composition as filtrate.

2. A method of preparing a lubricating oil composition containing a calcium salt of an alkylphenol of the formula:

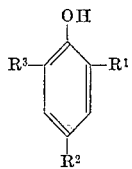

where $R^1$ and $R^3$ are selected from the group consisting of hydrogen and alkyl of from 1 to 30 carbons and $R^2$ is alkyl of from 4 to 30 carbons, comprising contacting said alkylphenol with calcium carbide and alcohol of the formula A—OH where A is alkyl of from 1 to 6 carbons or $R^4OR^5$, where $R^4$ is alkyl of from 1 to 5 carbons and $R^5$ is polymethylene of from 2 to 4 carbons, in the presence of a mineral lubricating oil of an SUS viscosity between about 50 and 300 at 100° F., said contacting conducted at a temperature between about 65 and 150° C. utilizing a mole ratio of said calcium carbide to said alkylphenol of between about 0.5:1 and 2:1 and a mole ratio of said alkylphenol to said alcohol of between about 1:1 and 1:20, said lubricating oil being present in the initial reaction mixture in an amount of between about 10 and 90 wt. percent, subsequently separating said alcohol from the final reaction mixture and then filtering the alcohol free final reaction mixture to recover said composition as filtrate.

3. A method in accordance with claim 2 wherein said mole ratio of said calcium carbide to said alkylphenol is at least 1:1 and said calcium salt is of the formula:

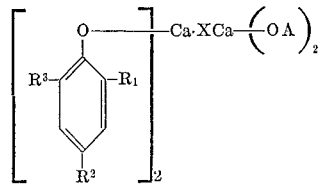

where X is an integer of 1 to 3 and $R^1$, $R^2$, $R^3$ and A are as heretofore defined.

4. A method in accordance with claim 2 wherein said mole ratio of said calcium carbide to said alkylphenol is less than 1:1 and said calcium salt is of the formula:

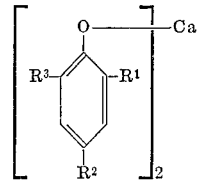

where $R^1$, $R^2$ and $R^3$ are as heretofore defined.

5. A method in accordance with claim 3 wherein said alcohol is 2-methoxyethanol, $R^1$ and $R^3$ are hydrogen, $R^2$ is $C_{10}$–$C_{12}$ alkyl and X is 1.

6. A method in accordance with claim 4 wherein said alcohol is 2-methoxyethanol, $R^1$ and $R^3$ are hydrogen and $R^2$ is $C_{10}$–$C_{12}$ alkyl.

7. A method in accordance with claim 4 wherein said alcohol is methanol, $R^1$ and $R^3$ are hydrogen and $R^2$ is $C_{10}$–$C_{12}$ alkyl.

8. A method in accordance with claim 2 wherein during said contacting and separating inert gas is passed through the reaction and distillation zones.

References Cited
UNITED STATES PATENTS

| | | | |
|---|---|---|---|
| 2,341,565 | 2/1944 | Lyman et al. | 260—632 XR |
| 2,835,688 | 5/1958 | Le Suer | 252—42.7 XR |
| 2,870,134 | 1/1959 | Kluge et al. | 252—42.7 XR |
| 2,892,782 | 6/1959 | Caffrey | 252—42.7 |
| 3,009,964 | 11/1961 | Russell | 260—632 |

DANIEL E. WYMAN, *Primary Examiner.*

W. A. CANNON, *Assistant Examiner.*

U.S. Cl. X.R.

260—615, 624, 632